United States Patent
Zhou et al.

(10) Patent No.: US 7,844,925 B2
(45) Date of Patent: Nov. 30, 2010

(54) SYSTEM AND METHOD FOR POWER DOMAIN OPTIMIZATION

(75) Inventors: Tingdong Zhou, Austin, TX (US); Michael A. Christo, Round Rock, TX (US); Julio A. Maldonado, Zapata, TX (US); Roger D. Weekly, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 11/753,644

(22) Filed: May 25, 2007

(65) Prior Publication Data
US 2008/0295041 A1 Nov. 27, 2008

(51) Int. Cl.
*G06F 17/50* (2006.01)
*G06F 9/45* (2006.01)

(52) U.S. Cl. .................... 716/2; 716/4; 716/8; 716/9; 716/10

(58) Field of Classification Search ............... 716/2, 716/4, 8–10
See application file for complete search history.

(56) References Cited

U.S. PATENT DOCUMENTS
2007/0188997 A1* 8/2007 Hockanson et al. ......... 361/760

OTHER PUBLICATIONS

Huber et al.; "Power Distribution Analysis for IBM eServer System Integration Optimization"; 2004; IBM Corporation; All Pages.*
Wang et al.; "EBG-Enhanced Split Power Planes for Wideband Noise Suppression"; 2005; IEEE; All Pages.*
Kim et al.; "An Efficient Path-Based Equivalent Circuit Model for Design, Synthesis, and Optimization of Power Distribution Networks in Multilayer Printed Circuit Boards"; 2004; IEEE; All Pages.*
Kamgaing et al.; "A Novel Power Plane with Integrated Simultaneous Switching Noise Mitigation Capability Using High Impedance Surface"; 2003; IEEE; All Pages.*
Cui et al.; "DC Power-Bus Noise Isolation with Power-Plane Segmentation"; 2003; IEEE; All Pages.*
McFiggins et al.; "Generalized Analytical Model for the Design of Irregularly Shaped Power Planes and Passives in Mixed Signal Applications"; 2004; IEEE; All Pages.*
Fan et al.; "Modeling DC Power-Bus Structures with Vertical Discontinuities Using a Circuit Extraction Approach Based on a Mixed-Potential Integral Equation Formulation"; May 2001; IEEE Transactions on Advanced Packaging, vol. 24; pp. 143-157.*
Lee et al.; "Optimized Design of Distributed Power Systems for High Efficiency, High Power Density and Low EMI Noise"; Jun. 2006; IEEE Intelec conference; pp. 1-12.*
Smith et al.; "Power Plane SPICE Models and Simulated Performance for Materials and Geometries"; Aug. 2001; IEEE Transactions on Advanced Packaging, vol. 24; pp. 277-287.*

* cited by examiner

*Primary Examiner*—Sun J Lin
*Assistant Examiner*—Suresh Memula
(74) *Attorney, Agent, or Firm*—Patrick E. Caldwell, Esq.; The Caldwelll Firm, LLC

(57) ABSTRACT

A method for electronic circuit power plane design includes analyzing direct current (DC) properties of a power plane of an electronic circuit. The method includes analyzing power net inductance (PNI) properties of the power plane and identifying victim areas of the power plane having predetermined current density properties based on the DC properties and the PNI properties of the power plane. The method further includes replacing the identified victim areas with ground (GND) shapes to form a modified power plane.

17 Claims, 6 Drawing Sheets

SYSTEM AND METHOD FOR POWER DOMAIN OPTIMIZATION

TECHNICAL FIELD

The present invention relates generally to the field of circuit design and manufacturing and, more particularly, to a system and method for circuit board power domain optimization.

BACKGROUND OF THE INVENTION

Modern electronic devices, such as computers, often include complex circuitry embodied on a substrate. In many configurations, the substrate is a printed circuit board (PCB), which can include a plurality of layers stacked vertically, with each layer configured for a particular function, such as, for example, signal wiring, power, or ground (GND). The particular arrangement of layers is a function of both the operational requirements of the circuit and the design and other constraints imposed by the design engineers.

One such design constraint is the number and placement of electromagnetic compatibility (EMC) capacitors in a circuit and/or card. EMC effects have become a major concern as clock speeds increase to ever higher rates. EMC capacitors decrease unwanted radiation produced by the systems in which they are employed, such as, for example, computers, servers, and test equipment. Additionally, current domestic rules and regulations require one EMC capacitor for every square inch of a voltage power shape in any layer of a printed circuit board.

As such, engineering design objectives and regulatory requirements together result in an increasing number of EMC capacitors employed on any particular circuit board. Increased EMC capacitors drives up the total cost of capacitors on the systems. Moreover, EMC capacitors couple to circuit boards through coupling holes bored through the substrate. These coupling holes decrease already scarce board space and greatly complicate wiring layout on the board.

Typical methods and systems configured to solve the congested wiring problem add additional circuit board layers to provide more room for signal wiring. This approach, however, typically increases the printed circuit board cost and increases the design time and complexity.

Therefore, there is a need for a system and/or method for power domain design that addresses at least some of the problems and disadvantages associated with conventional systems and methods.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved electronic circuit power plane design method.

It is a further aspect of the present invention to provide for an improved electronic circuit power plane system.

It is a further aspect of the present invention to provide for an improved method for electromagnetic compatibility (EMC) capacitor placement in a power plane design.

It is a further aspect of the present invention to provide for an improved system for EMC capacitor placement in a power plane design.

It is a further aspect of the present invention to provide for an improved electronic circuit power plane with a reduced number of EMC capacitors.

The aforementioned aspects and other objectives and advantages can now be achieved as described herein. A method for electronic circuit power plane design includes analyzing direct current (DC) properties of a power plane of an electronic circuit. The method includes analyzing power net inductance (PNI) properties of the power plane and identifying victim areas of the power plane having predetermined current density properties based on the DC properties and the PNI properties of the power plane. The method further includes replacing the identified victim areas with ground (GND) shapes to form a modified power plane.

In an alternate embodiment, a system includes a power plane comprising a plurality of power shapes. The plurality of power shapes defines a first area with a first current density. The power plane further comprises a plurality of ground shapes. The plurality of ground shapes defines a second area with a second current density. The first current density comprises a higher current density than the second current density and the first area comprises a plurality of electromagnetic compatibility (EMC) capacitors.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
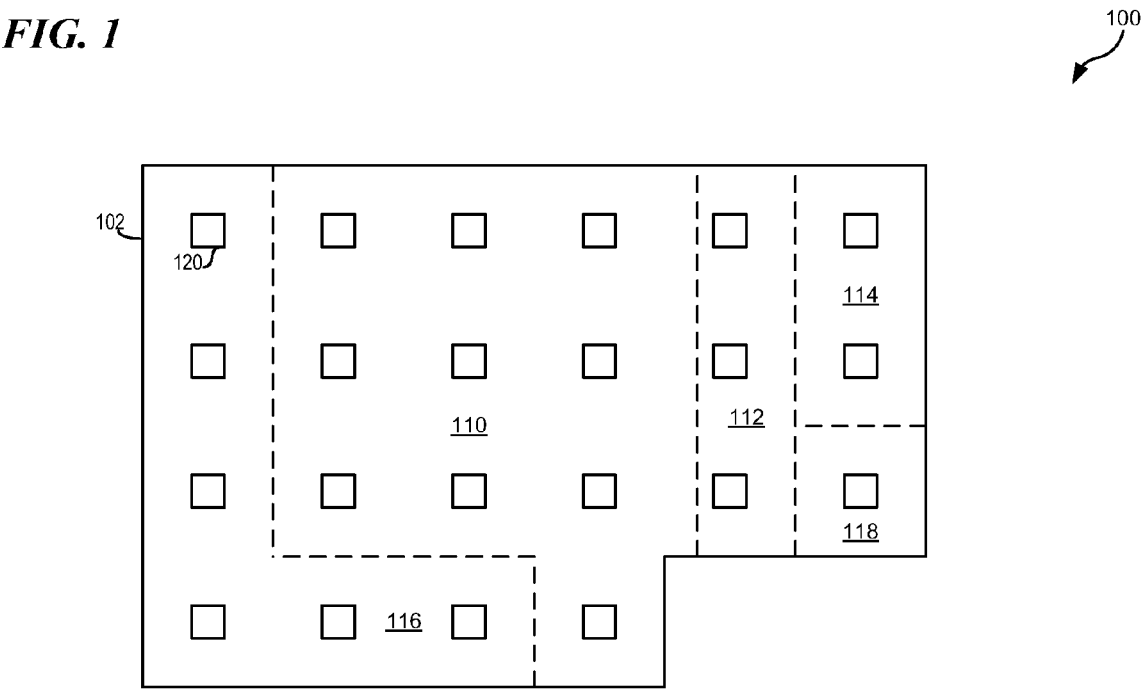
FIG. 1 illustrates a block diagram showing a top view of a power plane in accordance with the Prior Art.

The particular values and configurations discussed in these non-limiting examples can be varied and are cited merely to illustrate at least one embodiment and are not intended to limit the scope of the invention.

In the following discussion, numerous specific details are set forth to provide a thorough understanding of the present invention. Those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or in some combinations thereof. In a preferred embodiment, however, the functions are performed by a processor such as a computer or an electronic data processor in accordance with code such as computer program code, software, and/or integrated circuits that are coded to perform such functions, unless indicated otherwise.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus or otherwise tangible medium that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

Referring now to the drawings, FIG. 1 is a high-level block diagram illustrating certain components of a system 100, in accordance with the Prior Art. Generally, system 100 is an electronic device card, typically a printed circuit board (PCB) card comprising a plurality of layers or planes, such as, for example, signal layers, ground layers, and power layers. As illustrated, system 100 includes power plane 102.

Power plane 102 is a conventional power plane in a PCB card, depicted in a simplified form, not to scale. Specifically, power plane 102 includes a plurality of electromagnetic compatibility (EMC) capacitors 120. As shown, power plane 102 includes an EMC capacitor 120 located at regular intervals throughout power plane 102, illustrating the typical placement of one EMC capacitor per square inch of power shape as practiced in current methods and systems.

Additionally, power plane 102 includes a variety of regions of varying current density. For example, power plane 102 includes high current density region 110, medium current density region 112, low current density region 114, and very low current density regions 116 and 118. Generally, as used herein, "high," "medium," "low," or "very low" current density are relative terms and are based on the particular card design under consideration, as described in more detail below.

As illustrated, one skilled in the art will observe that power plane 102 includes an EMC capacitor 120 in each region, regardless of whether the current density in that region is high or very low. Accordingly, FIG. 1 illustrates one disadvantage of prior art systems and methods. Namely, prior art power planes typically include an EMC capacitor at regular intervals throughout the power plane without regard to the actual current density at any particular EMC capacitor location.

Figure 2:
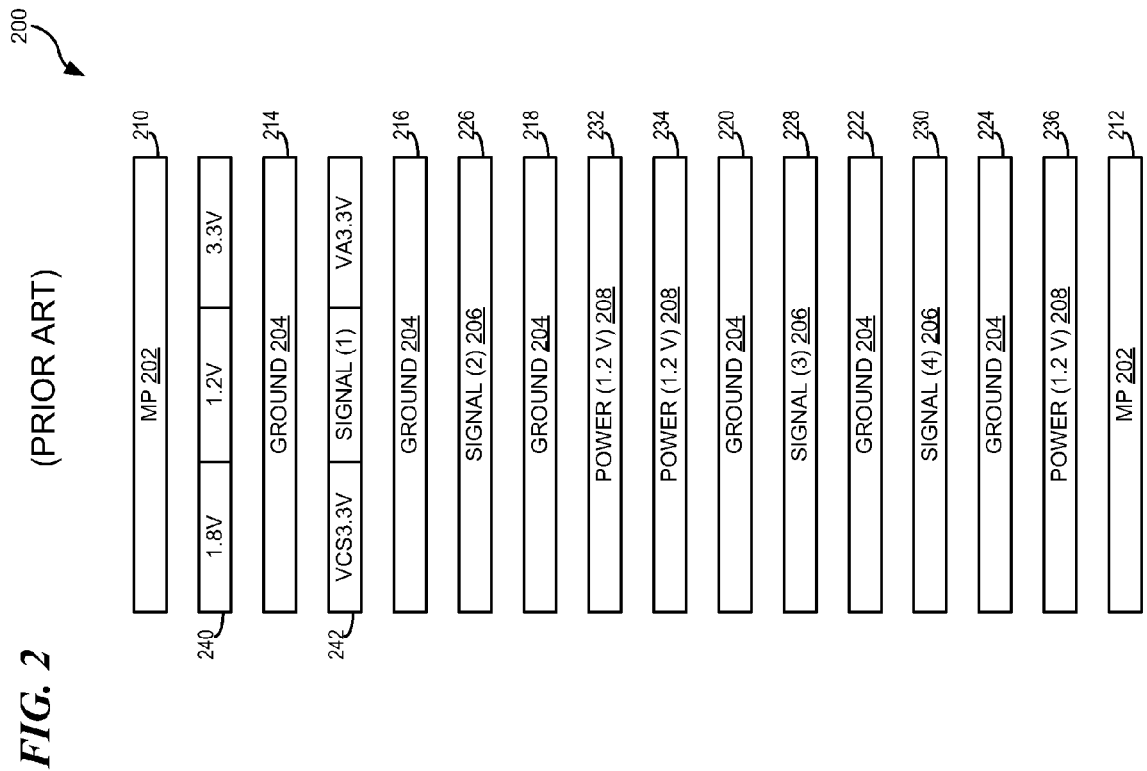
FIG. 2 illustrates a block diagram showing a layer view of a printed circuit board (PCB) card in accordance with the Prior Art.

FIG. 2 is a high-level block diagram illustrating certain components of a system 200, in accordance with the Prior Art, offered herein to illustrate by contrast certain improvements present in embodiments of the present invention. More particularly, FIG. 2 shows a layered view of a printed circuit board (PCB). In one embodiment, system 200 is an otherwise conventional PCB, modified as described below. In an alternate embodiment, system 200 is an organic chip carrier. Generally, system 200 can be any suitable system to embody circuits with a power domain on a substrate. As such, system 200 includes a plurality of layers of varying types and configurations.

For example, system 200 includes a mount plane (MP) layer 202. MP layer 202 is an otherwise conventional mount plane layer. In the illustrated embodiment, system 200 includes a first MP layer 210 and a second MP layer 212. Together, first MP layer 210 and second MP layer 212 bracket system 200.

System 200 also includes a plurality of ground layers 204. Ground layer 204 is an otherwise conventional ground layer. In the illustrated embodiment, system 200 includes a first ground layer 214, a second ground layer 216, a third ground layer 218, a fourth ground layer 220, a fifth ground layer 222, and a sixth ground layer 224.

System 200 also includes a plurality of signal layers 206. Signal layer 206 is an otherwise conventional signal layer, generally comprising a plurality of signal wiring and other circuitry, as one skilled in the art will understand. In the illustrated embodiment, system 200 includes a first signal layer, described in more detail below, a second signal layer 226, a third signal layer 228, and a fourth signal layer 230.

System 200 also includes a plurality of power planes or layers 208. Power plane 208 is an otherwise conventional power plane, generally configured to regulate and distribute power throughout system 200, as one skilled in the art will understand. In practice, typical prior art systems build voltage layers with as much power copper as possible, ordinarily filling the entire plane with metal. In the illustrated embodiment, system 200 includes a first power plane 232, a second power plane 234, and a third power plane 236, each of which operates at 1.2 V.

System 200 also includes a composite power plane 240. Composite power plane 240 includes three disparate power domains. As illustrated, composite power plane 240 includes a 1.8 V domain, a 1.2 V domain, and a 3.3 V domain. One skilled in the art will understand that system 200 can include various configurations for composite power planes, based on the overall circuit design for the system.

System 200 also includes a combination plane 242. Combination plane 242 includes two special power domains and a signal domain. As illustrated, combination plane 242 includes a first 3.3 V power domain, a second 3.3 V power domain, and the first signal domain 206 described above. One skilled in the art will understand that system 200 can include various configurations for combination plane 242, based on the overall circuit design for the system.

In the illustrated embodiment, system 200 includes four signal wiring layers 206. System 200 also includes four power planes 208. Three of the four power planes are configured for use only by the 1.2 V power domain and are typically configured with full metal, as one skilled in the art will understand.

The fourth power plane, composite power plane 240 comprises three different voltage level areas or domains. In one embodiment, the 1.8 V and 3.3 V power domains do not use much current, and the 1.2 V power domain occupies the majority of composite power plane 240 area. In the illustrated embodiment, to meet EMC requirements, the illustrated design requires an EMC capacitor every square inch for the 1.2 V power domain across the entire system 200. Additionally, this design requires an EMC capacitor in the 1.8 V and 3.3 V power domains in every square inch of these domains of system 200.

In general circuit design, one skilled in the art will understand that there are three typical objectives in adding a voltage or power shape to a design. Good circuit design introduces power shapes to reduce IR drop, for low-power net loop inductance, and for good high-frequency signal return current path. Generally, for the DC design configuration, providing additional metal areas to carry out DC current helps ensure that the current density across an etch plane in the printed circuit board is reasonable. Too much current crowding through a thin etch can cause overheating or even burning of the board. Additionally, the voltage gradient across a voltage domain should be small enough not to cause performance degradation or even functional failure.

For the AC design configuration, in a preferred embodiment, the loop inductance of the power delivery net should be small, in order to avoid excessive power noise when the current flowing in the power net changes. Also, for AC reasons, in a preferred embodiment, each high-frequency net should have a power reference available so that the high-frequency signal nets have sound current return paths. This helps manage crosstalk between the high-frequency nets.

Together, these design considerations restrict prior art systems' ability to provide circuit patterns that optimize the power planes, particularly with respect to EMC capacitor count and placement. The present invention overcomes these disadvantages by providing a novel method and system for optimizing power planes.

Figure 3:
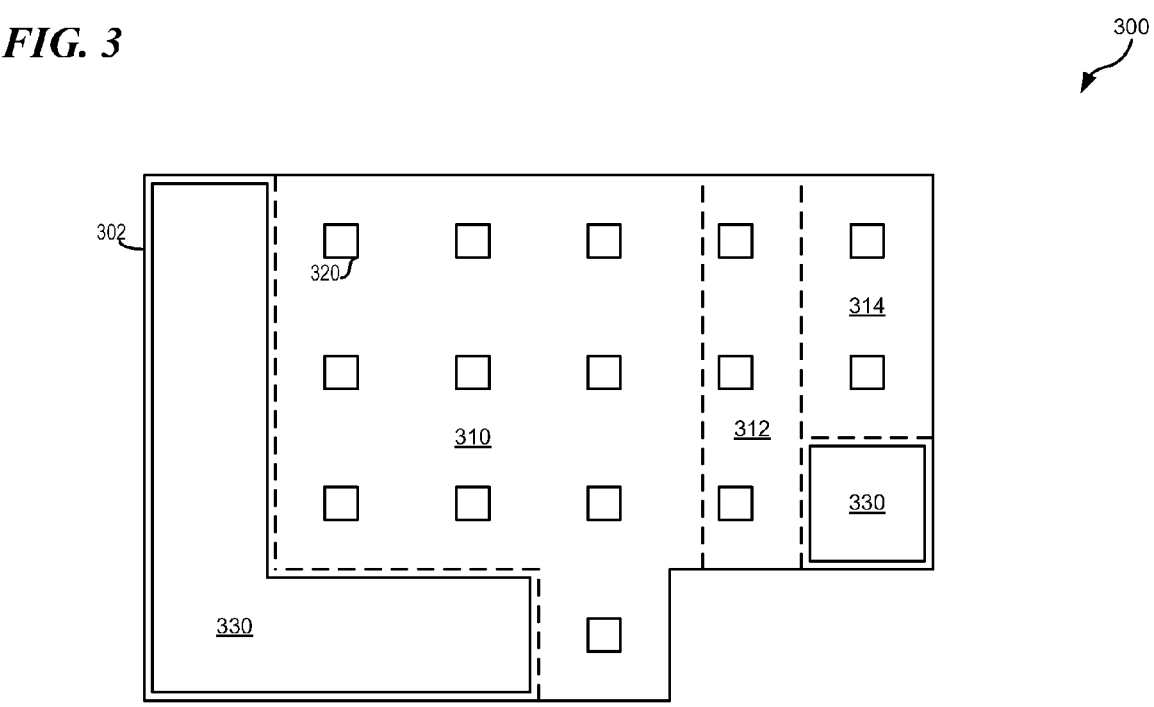
FIG. 3 illustrates a block diagram showing a top view of a power plane in accordance with a preferred embodiment.

Specifically, FIG. 3 is a high-level block diagram illustrating certain components of a system 300, in accordance with a preferred embodiment. Generally, system 300 is an electronic device card comprising a plurality of planes, much like conventional electronic device cards. As illustrated, however, system 300 includes power plane 302, an improved power plane.

For ease of illustration, FIG. 3 depicts power plane 302 in a simplified form, not to scale. Power plane 302 includes a plurality of EMC capacitors 320. As shown, power plane 302 includes an EMC capacitor 320 located at regular intervals throughout certain regions of power plane 302.

Power plane 302 includes a variety of regions of varying current density. For example, power plane 302 includes a high current density region 310, a medium current density region 312, and a low current density region 314. Power plane 302 also includes two ground (GND) shapes 330.

Generally, ground shapes 330 are otherwise conventional ground shapes as used in electronic card design, as one skilled in the art will understand. As shown, ground shapes 330 do not include EMC capacitors 320. Generally, system 300 replaces very low current density regions of power plane 302 with ground shapes 330. As described in more detail below, ground shapes 330 do not adversely affect power delivery to other system components. Accordingly, system 300 employs fewer EMC capacitors 320 than a comparable prior art system, such as, for example, system 100 of FIG. 1.

Figure 4:
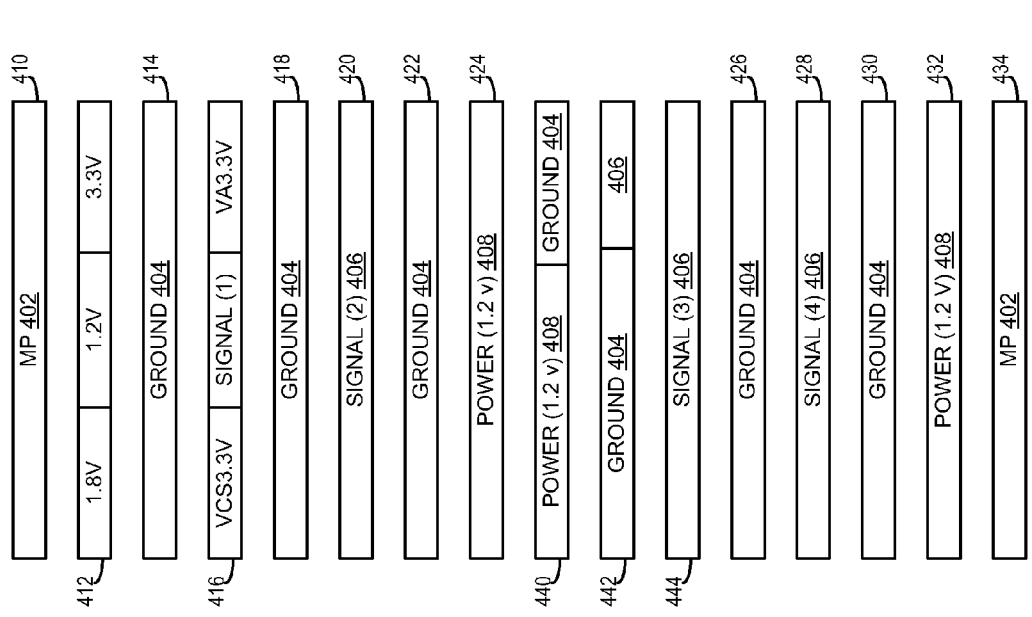
FIG. 4 illustrates a block diagram showing a layer view of a printed circuit board (PCB) card in accordance with a preferred embodiment.

FIG. 4 is a high-level block diagram illustrating certain components of a system 400, in accordance with one embodiment of the present invention. More particularly, FIG. 4 shows a layered view of a PCB, which includes a plurality of layers of varying types and configurations. Generally, system 400 is configured in a manner similar to system 200 of FIG. 2, as described above.

For example, system 400 includes an MP layer 410, a composite power plane layer 412, a ground layer 414, a combination layer 416, a ground layer 418, a signal layer 420, a ground layer 422, and a power layer 424. System 400 also includes a ground layer 426, a signal layer 428, a ground layer 430, a power layer 432, and an MP layer 434. One skilled in the art will understand these layers are otherwise conventional layers as described above.

However, system 400 includes certain modified layers in accordance with one embodiment of the present invention. Specifically, system 400 includes power layer 440, an improved power layer. As shown, part of power layer 440 is a power layer 408, as described above. The remainder of power layer 440 is a ground layer 404, as described above. Accordingly, power layer 440 represents an improved power layer, such as, for example, power plane 302 of FIG. 3.

The layer view shown in FIG. 4 illustrates one advantage of the improved power layer of the present invention. More particularly, system 400 includes an improved ground layer 442 and an extended signal layer 444. As illustrated, power layer 440 includes a ground layer 404. As such, improved ground layer 442 includes a partial ground layer 404 and a signal layer 406. The signal layer 406 of improved ground layer 442 therefore expands the available design area for signal layer 444.

Thus, adding ground shapes to power layer 440 frees up design area for nearby signal layers. As described above, decreasing the power plane area reduces the number of required EMC capacitors. As shown in FIG. 4, the improved power plane of the present invention can also increase the design area available for signal wiring.

Figure 5:
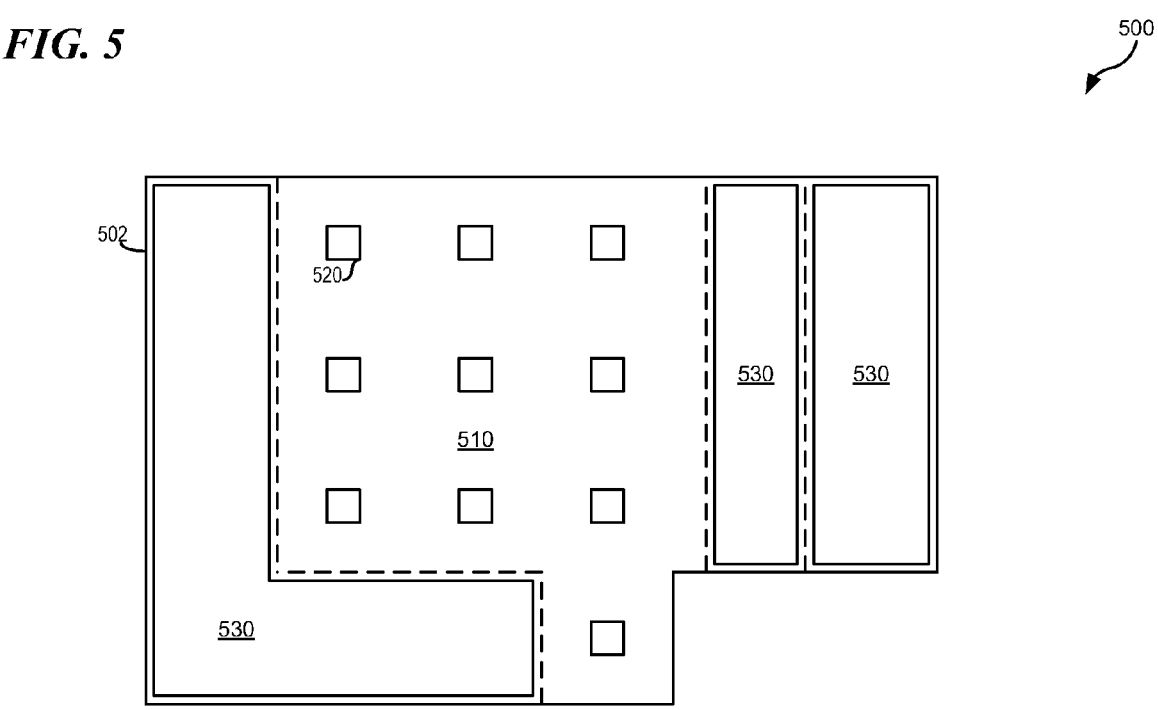
FIG. 5 illustrates a block diagram showing a top view of a power plane in accordance with a preferred embodiment.

The amount of power plane area reduction depends in part on the particular circuit configuration under consideration. Additionally, the design engineer can determine a threshold level of current density that can be replaced with ground shapes. For example, in the embodiment illustrated in FIG. 3, the "very low" current density areas 116 and 118 of FIG. 1 are replaced by ground shapes 330 in FIG. 3. In an alternate embodiment, ground shapes replace low and/or medium current density areas in addition to very low current density areas. FIG. 5 illustrates an exemplary embodiment.

Specifically, FIG. 5 is a high-level block diagram illustrating certain components of a system 500, in accordance with a preferred embodiment. Generally, system 500 is an electronic device card comprising a plurality of planes, much like conventional electronic device cards. As illustrated, however, system 500 includes power plane 502, an improved power plane.

For ease of illustration, FIG. 5 depicts power plane 502 in a simplified form, not to scale. Power plane 502 includes a plurality of EMC capacitors 520. As shown, power plane 502 includes an EMC capacitor 520 located at regular intervals throughout certain regions of power planes 502.

Power plane 502 includes a variety of regions of varying current density. As illustrated, power plane 502 includes a high current density region 510. In the illustrated embodiment, the medium, low, and very low current density regions have been replaced with ground shapes 530. Accordingly, system 500 employs even fewer EMC capacitors 520 than a comparable prior art system, such as, for example, system 100 of FIG. 1.

Figure 6:
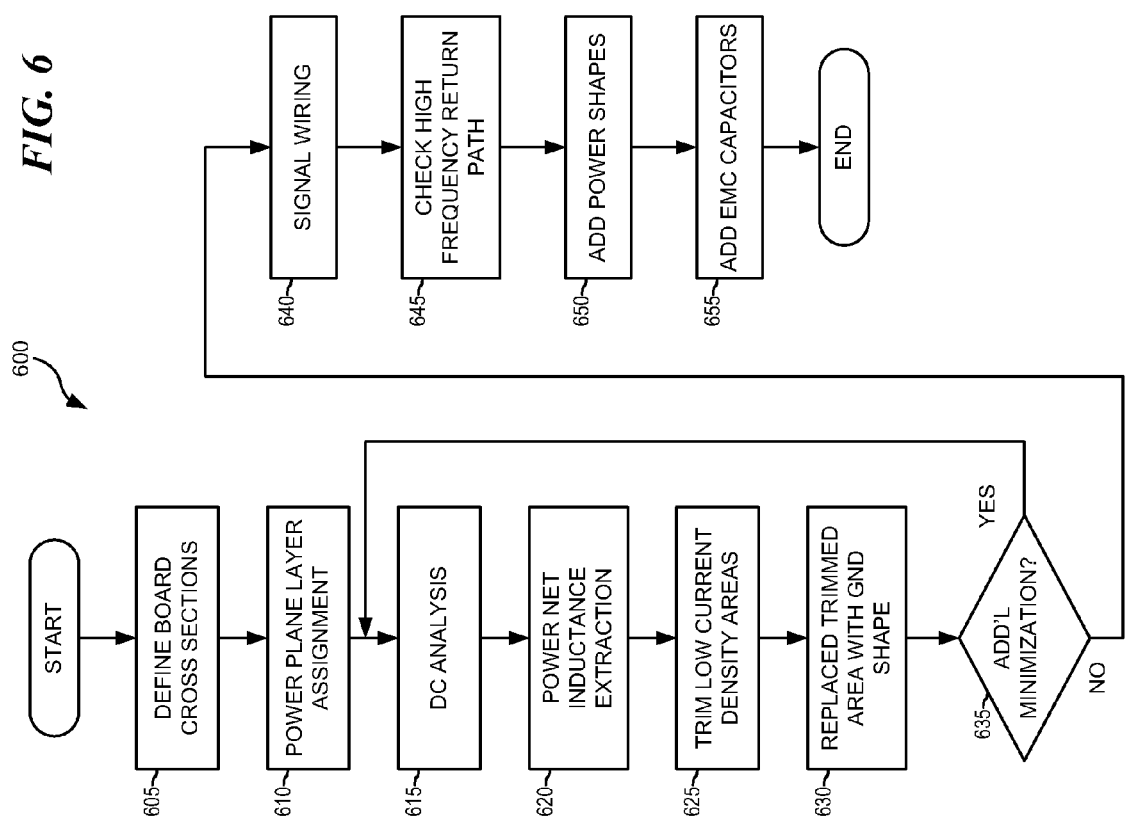
FIG. 6 illustrates a high-level flow diagram depicting logical operational steps of an improved power plane design method, which can be implemented in accordance with a preferred embodiment.

One can construct the embodiments described above in accordance with the following method. Specifically, FIG. 6 illustrates one embodiment of a method for improved power plane and design. FIG. 6 illustrates a high-level flow chart 600 that depicts logical operational steps performed by, for example, a design engineer in designing an improved power plane in accordance with a preferred embodiment, such as, for example, system 300 of FIG. 3 and/or system 500 of FIG. 5.

As indicated at block 605, the process begins, wherein the design engineer defines the PCB cross sections. One skilled in the art will understand that this step is a conventional component of modern PCB design. Next, as indicated at block 610, the design engineer assigns power planes to one or more layers of the PCB. One skilled in the art will understand that this step as well is a conventional component of modern PCB design.

Next, as indicated at block 615, the design engineer conducts DC analysis of a power plane of the PCB. Generally, instead of filling the entire voltage layer with power shapes, as is customary in the Prior Art, the design engineer runs a DC analysis for the power domain. One skilled in the art will understand that there are several tools commonly available to perform DC analysis. Such tools include Sigrity's PowerDC, IBM internal tools including Rgen and PATs, among others.

Next, as indicated at block 620, the design engineer performs inductance simulation to extract the power net inductance of the power plane and to analyze other electronic characteristics of the card. One skilled in the art will understand that there are several tools commonly available to perform inductance simulation. Such tools include Sigrity's PowerSI, and IBM internal tools including LCgen, among others.

Next, as indicated at block 625, the design engineer trims low current density areas from the power plane. As described above, "low" current density can be relative to the current density level on other areas of the card, including other power planes. Accordingly, the design engineer can use predetermined current density properties to identify victim areas of the power planes. Next, as indicated at block a 630, the design engineer replaces the trimmed areas (the "victim areas") of the power plane with ground shapes.

As such, from both DC analysis and inductance simulation, the design engineer can decrease the total power shape area in a power plane, while still maintaining required functionality. The resulting power shapes are thus designed to avoid a high DC voltage drop and to provide good power delivery with managed middle frequency noise. Applying this technique on all voltage layers in the design can eliminate a significant number of EMC capacitors. As described above, this frees valuable board space for other components, additionally simplifying wiring the rest of the chip and components of the system.

Next, as indicated at decisional block 635, the design engineer determines whether any additional power shape area minimization is desired. In a preferred embodiment, one iteration of DC analysis, inductance simulation, low current density trimming, and ground shape replacement provides an improvement in EMC capacitor count reduction that requires no further power plane trimming. In an alternate embodiment, however, the design engineer can perform additional iterations to remove additional power plane areas.

If at decisional block 635 the design engineer determines that additional power shape area minimization is desired, the process continues along the YES branch, returning to block 615. If at decisional block 635 the design engineer determines that additional power shape area minimization is not desired, the process continues along the NO branch to block 640.

Next, as indicated at block 640, the design engineer lays out the signal wiring for the PCB in which the power plane under consideration is employed. One skilled in the art will understand that much of the signal wiring layout can be finalized prior to the power plane optimization described herein. In one embodiment, the design engineer lays out draft wiring patterns before DC analysis, followed by signal wiring revisions as indicated at block 640, based on the power plane optimization as indicated at blocks 615 through 630.

Next, as indicated at block 645, the design engineer identifies and verifies that the high-frequency return paths for the power plane meet operational requirements. Next, as indicated at block 650, the design engineer adds additional power shapes to the power plane as necessary to meet operational requirements. In one embodiment, the design engineer adds power shapes based upon the high-frequency return paths verification indicated at block 645.

Next, as indicated at block 655, the design engineer adds EMC capacitors to the power plane in accordance with functional, operational, regulatory, and/or other requirements, and the process ends. Accordingly, the methods and embodiments described herein offer numerous technical advantages over Prior Art systems and methods.

Specifically, in a preferred embodiment, the design engineer can customize the power shapes in each voltage layer. The design engineer can reduce the number of EMC capacitors by reducing the voltage plane area, without changing the functionality of the plane. That is, the power plane retains current delivery with acceptable DC drop, gradient, and power noise characteristics, and provides return paths for high-frequency signal nets. In a preferred embodiment, the design engineer can position the power shapes to provide power to the parts of the card that are needed, without having excess copper where no, or low, DC/AC current flows. In a particular embodiment, the design engineer adds ground shapes to the parts of the card where voltage is not needed. Accordingly, the area covered by the ground shapes does not require EMC capacitors, thereby directly reducing the number of capacitors required in the overall design.

As described above, minimizing the number of EMC capacitors provides certain advantages. For example, one consequent result of reduced EMC capacitors is that the printed-through-hole (PTH) vias that could block signal wiring are also removed from the printed circuit board. Therefore, more wiring channels are available on a single signal wiring layer. Adding more wiring channels itself provides certain advantages.

For example, with additional available wiring channels, the physical design of the printed circuit board will require less time, thereby also reducing the time to market. Additionally, the design will require fewer total signal wiring layers, so that a particular printed circuit board cross-section can be configured with fewer metal layers. And fewer metal layers can significantly reduce the manufacturing cost of such a printed circuit board.

One skilled in the art will appreciate that variations of the above-disclosed and other features and functions, or alternatives thereof, may be desirably combined into many other different systems or applications. Additionally, various presently unforeseen or unanticipated alternatives, modifications, variations or improvements therein may be subsequently made by those skilled in the art, which are also intended to be encompassed by the following claims.

What is claimed is:

1. A method for electronic circuit power plane design, comprising:
   analyzing, with a computer system, direct current (DC) properties of a power plane of an electronic circuit;
   analyzing power net inductance (PNI) properties of the power plane;
   identifying victim areas of the power plane having predetermined current density properties based on the DC properties and the PNI properties of the power plane; and
   replacing the identified victim areas with ground (GND) shapes to form a modified power plane.

2. The method of claim 1, further comprising:
   analyzing a high frequency return path of the modified power plane; and
   adding at least one power shape to the modified power plane based on the high frequency return path.

3. The method of claim 1, further comprising:
   analyzing DC properties of the modified power plane;
   analyzing PNI properties of the modified power plane;
   identifying victim areas of the modified power plane based on the DC properties and the PNI properties of the modified power plane; and
   replacing the victim areas with GND shapes to form a second modified power plane.

4. The method of claim 1, further comprising adding electromagnetic coupling (EMC) capacitors to the modified power plane.

5. The method of claim 1, further comprising providing signal wiring for the modified power plane.

6. The method of claim 1, wherein the power plane comprises a power layer of a printed circuit board (PCB), the method further comprising providing signal wiring for the PCB.

7. The method of claim 1, wherein the power plane comprises a power layer of a printed circuit board (PCB), the method further comprising modifying a ground layer adjacent to the modified power plane based on the modified power plane configuration.

8. The method of claim 1, further comprising defining a cross section of a printed circuit board (PCB) to include the power plane.

9. The method of claim 1, wherein the predetermined current density properties define low current density areas of the power plane.

10. A computer program product for electronic circuit power plane design, the computer program product having a tangible and non-transitory computer-readable medium with a computer program embodied thereon, the computer program comprising:
    computer code for analyzing direct current (DC) properties of a power plane of an electronic circuit;
    computer code for analyzing power net inductance (PNI) properties of the power plane;
    computer code for identifying victim areas of the power plane having predetermined current density properties based on the DC properties and the PNI properties of the power plane; and
    computer code for replacing the identified victim areas with ground (GND) shapes to form a modified power plane.

11. The computer program product of claim 10, further comprising:
    computer code for analyzing a high frequency return path of the modified power plane; and
    computer code for adding at least one power shape to the modified power plane based on the high frequency return path.

12. The computer program product of claim 10, further comprising:
    computer code for analyzing DC properties of the modified power plane;
    computer code for analyzing PNI properties of the modified power plane;
    computer code for identifying victim areas of the modified power plane based on the DC properties and the PNI properties of the modified power plane; and
    computer code for replacing the victim areas with GND shapes to form a second modified power plane.

13. The computer program product of claim 10, further comprising computer code for adding electromagnetic coupling (EMC) capacitors to the modified power plane.

14. The computer program product of claim 10, further comprising computer code for providing signal wiring for the modified power plane.

15. The computer program product of claim 10, wherein the power plane comprises a power layer of a printed circuit board (PCB), the processor further comprising computer code for providing signal wiring for the PCB.

16. The computer program product of claim 10, wherein the power plane comprises a power layer of a printed circuit board (PCB), the processor further comprising computer code for modifying a ground layer adjacent to the modified power plane based on the modified power plane configuration.

17. The computer program product of claim 10, further comprising computer code for defining a cross section of a printed circuit board (PCB) to include the power plane.

* * * * *